United States Patent
Iyer et al.

(10) Patent No.: US 12,244,503 B2
(45) Date of Patent: Mar. 4, 2025

(54) INFORMATION HANDLING SYSTEM CLOSED LOOP BANDWIDTH PRIORITIZATION

(71) Applicant: Dell Products L.P., Round Rock, TX (US)

(72) Inventors: Vivek Viswanathan Iyer, Austin, TX (US); Dileep Kumar Soma, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 306 days.

(21) Appl. No.: 17/144,637

(22) Filed: Jan. 8, 2021

(65) Prior Publication Data
US 2022/0224649 A1 Jul. 14, 2022

(51) Int. Cl.
*H04L 47/24* (2022.01)
*H04L 47/70* (2022.01)

(52) U.S. Cl.
CPC ............ *H04L 47/24* (2013.01); *H04L 47/821* (2013.01)

(58) Field of Classification Search
CPC ............................. H04L 47/24; H04L 47/821
See application file for complete search history.

(56) References Cited

U.S. PATENT DOCUMENTS

| | | | | |
|---|---|---|---|---|
| 6,859,435 B1* | 2/2005 | Lee | ............... | H04L 47/26 370/231 |
| 9,225,672 B1* | 12/2015 | Dropps | ............... | H04L 49/254 |
| 9,608,888 B2* | 3/2017 | Yamamori | ............... | H04L 49/555 |
| 9,608,926 B2* | 3/2017 | Suzuki | ............... | H04L 47/623 |
| 9,774,538 B2* | 9/2017 | Jun | ............... | H04W 28/0205 |
| 10,708,189 B1* | 7/2020 | Agrawal | ............... | H04L 49/3009 |
| 11,075,847 B1* | 7/2021 | Kwan | ............... | H04L 47/283 |
| 11,121,983 B1* | 9/2021 | Edwards | ............... | H04L 47/20 |
| 2002/0129377 A1* | 9/2002 | Cloonan | ............... | H04N 21/6377 348/E7.071 |
| 2003/0169746 A1* | 9/2003 | Kitazawa | ............... | H04L 47/24 370/395.42 |
| 2006/0233191 A1* | 10/2006 | Pirzada | ............... | H04W 12/06 370/254 |
| 2007/0183320 A1* | 8/2007 | Chen | ............... | H04L 47/50 370/395.42 |
| 2007/0297435 A1* | 12/2007 | Bucknell | ............... | H04L 47/56 370/412 |
| 2010/0020681 A1* | 1/2010 | Nakashima | ............... | H04L 12/4625 370/437 |

(Continued)

*Primary Examiner* — Syed Ali
(74) *Attorney, Agent, or Firm* — Norton Rose Fulbright US LLP

(57) ABSTRACT

A host information handling system may aggregate a plurality of packets for transmission from the host information handling system to a plurality of client information handling systems. The host information handling system may then assign a priority value to each of the plurality of packets. The host information handling system may then determine that an aggregate size of the plurality of packets exceeds a threshold size. Based, at least in part, on the determination, the host information handling system may select a subset of the plurality of packets for transmission to the plurality of client information handling systems. The host information handling system may then transmit the selected subset of the plurality of packets to the plurality of client information handling systems.

14 Claims, 7 Drawing Sheets

(56) References Cited

U.S. PATENT DOCUMENTS

| | | | |
|---|---|---|---|
| 2011/0083175 A1* | 4/2011 | Bharrat | H04L 47/20 709/224 |
| 2011/0119761 A1* | 5/2011 | Wang | H04L 63/1458 726/23 |
| 2011/0317713 A1* | 12/2011 | Assarpour | H04L 12/4625 370/412 |
| 2012/0099456 A1* | 4/2012 | Tamura | H04L 49/3045 370/252 |
| 2012/0176903 A1* | 7/2012 | Kastenholtz | H04L 47/12 370/235 |
| 2013/0039183 A1* | 2/2013 | Nooren | H04L 41/5019 370/235 |
| 2014/0112131 A1* | 4/2014 | Todaka | G06F 13/4022 370/230 |
| 2014/0146676 A1* | 5/2014 | Howes | H04L 47/2441 370/235 |
| 2014/0344401 A1* | 11/2014 | Varney | H04L 41/0803 709/217 |
| 2016/0234039 A1* | 8/2016 | Ng | H04L 43/0882 |
| 2016/0241484 A1* | 8/2016 | De Schepper | H04L 47/196 |
| 2016/0294698 A1* | 10/2016 | Berberana Fernandez-Murias | H04L 47/12 |
| 2017/0279730 A1* | 9/2017 | Calin | H04L 49/9005 |
| 2018/0091427 A1* | 3/2018 | Kumar | H04L 43/0894 |
| 2018/0145842 A1* | 5/2018 | Golin | H04L 47/30 |
| 2018/0176816 A1* | 6/2018 | Meylan | H04L 47/2433 |
| 2018/0191629 A1* | 7/2018 | Biederman | H04W 72/0446 |
| 2018/0191642 A1* | 7/2018 | Biederman | H04L 47/6275 |
| 2018/0302328 A1* | 10/2018 | Keith | H04L 43/16 |
| 2019/0166057 A1* | 5/2019 | Gilson | H04L 65/80 |
| 2020/0389915 A1* | 12/2020 | Sundararajan | H04W 72/14 |
| 2021/0006513 A1* | 1/2021 | Gafni | H04L 47/805 |
| 2021/0044531 A1* | 2/2021 | Mellette | H03K 19/17744 |
| 2021/0051105 A1* | 2/2021 | Halepovic | H04L 43/16 |
| 2021/0058369 A1* | 2/2021 | Hillis | H04L 63/0236 |
| 2021/0151056 A1* | 5/2021 | Trim | H04L 41/16 |
| 2021/0203621 A1* | 7/2021 | Ylisirniö | H04L 49/9052 |
| 2021/0409335 A1* | 12/2021 | Zhu | H04L 47/24 |
| 2023/0269193 A1* | 8/2023 | Wittenmark | H04L 47/283 370/235 |

* cited by examiner

INFORMATION HANDLING SYSTEM CLOSED LOOP BANDWIDTH PRIORITIZATION

FIELD OF THE DISCLOSURE

The present disclosure generally relates to information handling systems, and more particularly relates to bandwidth prioritization in networks having multiple information handling systems.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Information handling systems are increasingly interconnected. For example, an information handling system may be connected to multiple other information handling systems at the same time for transmission and reception of data. In some cases, a single information handling system may simultaneously receive data from and/or transmit data to multiple information handling systems. For example, a wireless dock may receive data from and/or transmit data to multiple other information handling systems, such as multiple laptop or desktop computers.

Information handling systems may, however, have limited bandwidth for communication. Bandwidth limitations may cause an information handling system to operate slowly when connected to multiple external information handling systems and/or to fail to transmit or receive data from connected information handling systems. Slowdowns in data transmission and reception and data transmission or reception failure can negatively impact a user experience.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A host information handling system connected to multiple client information handling systems may manage allocation of uplink and downlink bandwidth to prioritize transmission and reception of data that is most important to a user. A host information handling system may aggregate a plurality of data packets from multiple client information handling systems and may assign priority values to each of the data packets. The host information handling system may then analyze an aggregate size of the plurality of data packets to determine if the aggregate size exceeds an uplink capacity of the host information handling system. If the aggregate size does exceed the uplink capacity of the host information handling system, the host information handling system may select a subset of the plurality of packets for transmission to the client information handling systems based, at least in part, on the assigned priority values while maintaining an aggregate size of the selected subset of the plurality of packets at or below the capacity of the host information handling system. A host information handling system may also allocate downlink bandwidth to each of a plurality of client information handling systems based, at least in part, on a number of client information handling systems connected to the host information handling system and based on a downlink capacity of the host information handling system. Closed loop uplink and downlink bandwidth management by a host information handling system connected to a plurality of client information handling systems may allow prioritization of data for transmission to client information handling systems and may allow management downlink bandwidth allocations of client information handling systems. Such prioritization and management may enhance a user experience by prioritizing data that is important to a user, reducing slowdowns in information handling system operation and/or data loss.

An example method for managing traffic associated with a host information handling system may begin with aggregating a plurality of packets for transmission from the host information handling system to one or more of a plurality of client information handling systems. For example, a plurality of packets may be generated by the host information handling system for transmission to one or more of a plurality of client information handling systems. Alternatively or additionally, the host information handling system may receive packets from one or more client information handling systems or one or more other information handling systems for transmission to one or more of the client information handling systems. The host information handling system may, for example, be a wireless or wired dock connecting multiple client information handling systems to each other. As another example, the host information handling system may be a laptop computer that is connected to a plurality of client laptop computers, tablets, and/or smart displays. The host information handling system may be connected to the client information handling systems via a local network, via wired and/or wireless connections.

The host information handling system may then assign a priority value to each of the plurality of packets. For example, the host information handling system may determine one or more characteristics of each of the plurality of packets, such as an information handling system at which the packet originated, an application with which the packet is associated, a type of data included in the packet, or another characteristic of the packet, and may assign priority values to each packet based on the characteristics of each packet. For example, the information handling system may assign each packet to one of a plurality of buckets associated with a particular priority value based on one or more characteristics of the packet. In some embodiments, the host information handling system may receive priority values for one or more of the packets from one or more client information handling systems or one or more other information handling systems.

The host information handling system may then determine that an aggregate size of the plurality of packets exceeds a threshold size. For example, the host information handling system may assign a size value to each of the plurality of packets based, at least in part, on a length of each of the plurality of packets. The host information handling system may then determine a sum of the size values of each of the plurality of packets to determine the aggregate size of the plurality of packets. The host information handling system may then compare the aggregate size of the plurality of packets with the threshold size and may determine that the aggregate size is greater than the threshold size. The threshold size may be a threshold size set based on an uplink capacity of the host information handling system. If the aggregate size of the plurality of packets exceeds an uplink capacity of the host information handling system transmission of all packets may result in packets being lost during transmission or an increase in an amount of time required to provide the users of the client information handling system with desired data.

The host information handling system may select a subset of the plurality of packets for transmission to one or more of the plurality of client information handling systems. The subset of the plurality of packets may be selected based, at least in part, on the assigned priority values of each of the plurality of packets. For example, the subset of the plurality of packets may be selected to maintain an aggregate size of the subset of the plurality of packets less than or equal to an uplink capacity of the host information handling system, while maximizing an aggregate priority value of the subset of the plurality of packets. Thus, a subset of packets may be selected that has a highest aggregate priority value of potential subset of packets while maintaining an aggregate size of the subset of the plurality of packets to be transmitted below the threshold size. Higher priority packets may thus be transmitted to the client information handling systems while lower priority packets may be delayed or dropped from transmission altogether.

The host information handling system may then transmit the subset of the plurality of packets to one or more of the plurality of information handling systems. In some embodiments the host information handling system may push packets of the plurality of packets that were not in the selected subset to a buffer of the host information handling system for transmission at a later time.

In some embodiments, the host information handling system may allocate downlink bandwidth allocations to each of a plurality of connected client information handling systems. For example, the host information handling system may have a maximum downlink bandwidth capacity for receiving downlink transmissions from client information handling systems. The host information handling system may determine a number of a plurality of client information handling systems connected to the host information handling system. For example, the host information handling system may communicate with the client information handling systems to determine a number of client information handling systems connected to the host information handling system.

The host information handling system may then allocate a downlink bandwidth to each of the plurality of client information handling systems. For example, the downlink bandwidth may be allocated to each of the client information handling systems based, at least in part, on the number of client information handling systems connected to the host information handling system. In some embodiments the host information handling system may allocate an equal amount of downlink bandwidth to each of the client information handling systems, while in other embodiments the host information handling system may allocate different amounts of downlink bandwidth to each of the client information handling systems. For example, the host information handling system may allocate bandwidth to the client information handling systems based on a priority ranking of the client information handling systems or based on historic downlink bandwidth usage by each of the client information handling systems.

The host information handling system may then transmit a signal indicating the allocated downlink bandwidth to each of the plurality of client information handling systems using an out of band communication channel. The out of band communication channels on which the signal is transmitted may, for example, be control channels between the host information handling system and each of the client information handling systems.

In some embodiments, the host information handling system may detect a change in downlink bandwidth usage by the one or more client information handling systems. For example, the host information handling system may detect that a client information handling system is using only a fraction of its allocated bandwidth. The host information handling system may update the downlink bandwidth allocations of one or more of the client information handling systems based on the detected change. For example, the host information handling system may increase downlink bandwidth allocations of client information handling systems that have used most or all of their respective allocated bandwidths during a predetermined period of time, while reducing downlink bandwidth allocations of client information handling systems that have not used most or all of their respective allocated bandwidths during the predetermined period of time. The host information handling system may then transmit a signal indicating the updated allocations of downlink bandwidths to each of the plurality of client information handling systems on out of band communications channels.

An information handling system may include processor and a memory configured to perform the steps described herein. Alternatively or additionally, a computer program product may include a non-transitory computer-readable medium comprising instructions to cause a processor to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
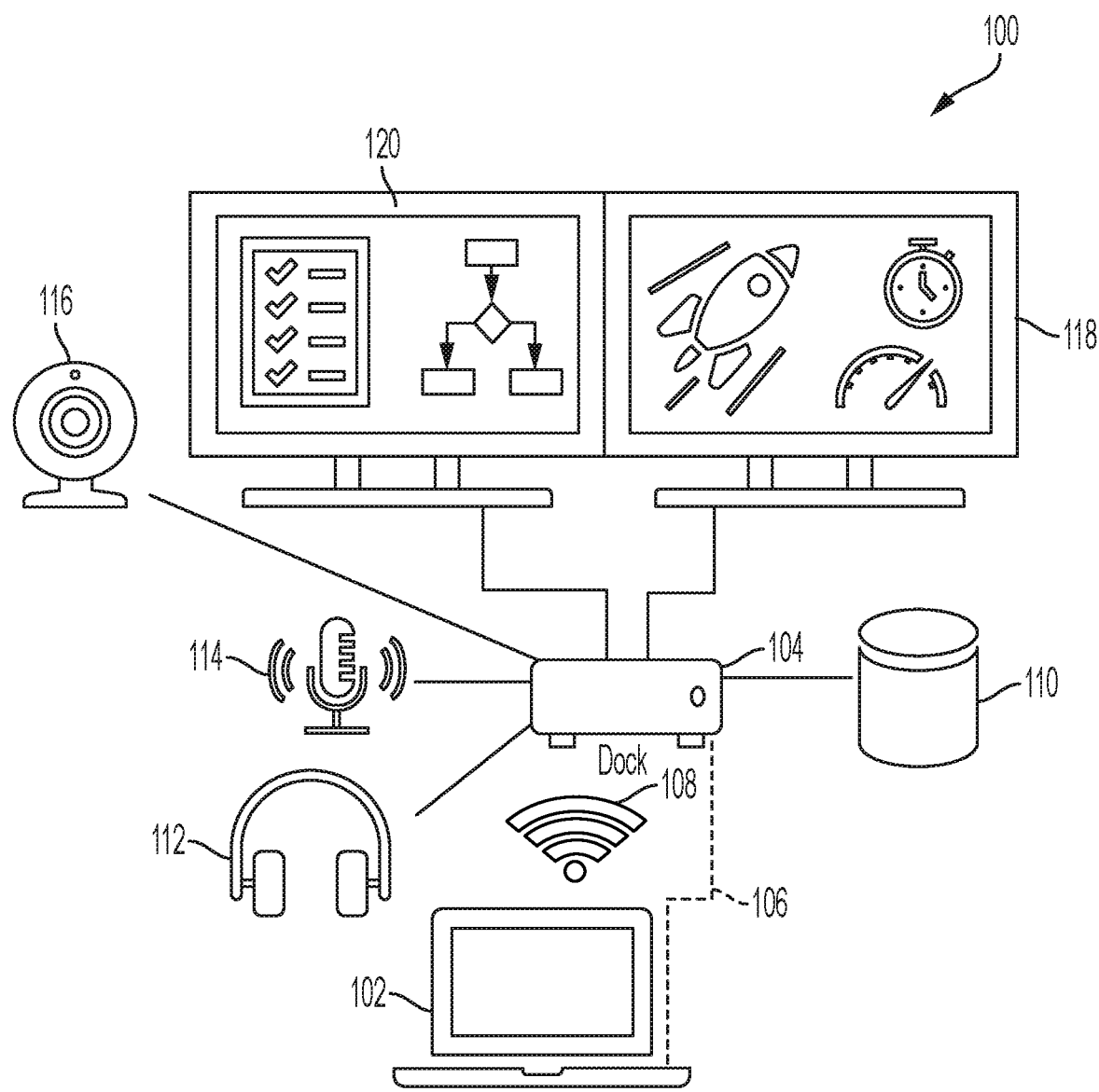
FIG. 1 is an illustration of an information handling system connected to multiple external devices via a dock, according to some embodiments of the disclosure.

Information handling systems may connect to multiple external devices, including other information handling systems. For example, an information handling system, such as a dock, may be used to connect an information handling system, such as a laptop or tablet computer, to multiple external devices, which may include other information handling systems. In some cases, a dock may connect an information handling system to external devices via wired and/or wireless connections between the dock and the information handling system and the dock and the external devices. For example, as shown in the example information handling system layout 100 of FIG. 1, an information handling system 102 may connect to a dock 104 via a wireless connection 108, such as a Bluetooth connection, a Wi-Fi connection, a wireless real-time transport protocol (RTP) over user datagram protocol (UDP) connection, and/or a wireless media-agnostic universal serial bus (MA-USB) over transmission control protocol (TCP) connection. The dock 104 may be connected to a plurality of peripheral devices, such as a first display 118, which may be a 4 k, 30 Hertz, 24-bit display or another kind of display, a second display 120, which may be a 4 k, 30 Hertz, 24-bit display or another kind of display, a camera 116, such as a webcam, a microphone 114, an audio device 112, such as headphones or speakers, and an external storage device 110, such as an external solid state drive. The dock 104 may further connect to the internet, to a local network, and/or to a power source. External devices connected to the dock 104 may include additional input devices, such as keyboards, computer mice, and trackpads. The information handling system 106 may be connected to the plurality of external devices 110-120 via the dock 104. For example, communications to and from the external devices 110-120 and the information handling system 102 may be transmitted via the dock 104 and via the wireless connection 108 between the information handling system and the dock 104. The dock 104 may also connect the information handling system 102 to other external information handling systems, such as laptop computers, desktop computers, tablets, smart phones, and other external information handling systems.

Figure 2:
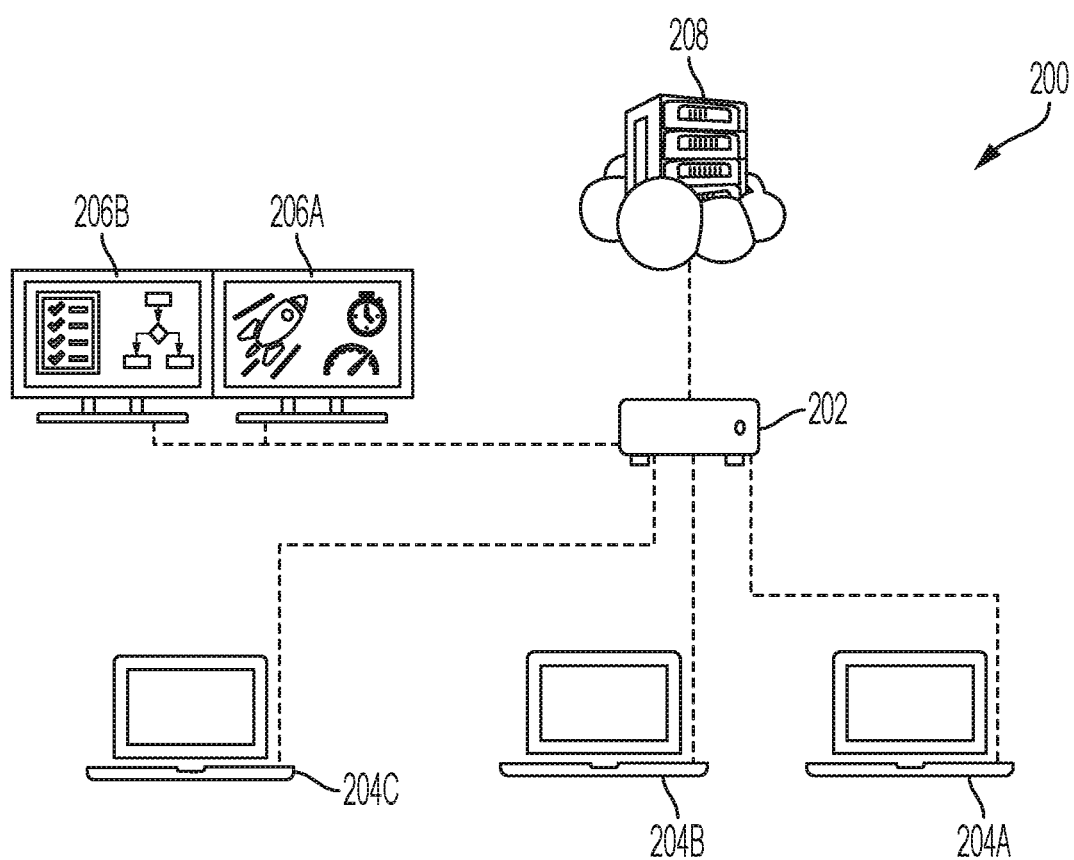
FIG. 2 is an illustration of an example dock connected to a plurality of information handling systems according to some embodiments of the disclosure.

A host information handling system, such as a wireless dock, may connect to multiple client information handling systems to receive information from and transmit information to the client information handling systems. An example network of information handling systems 200 is shown in FIG. 2. A host information handling system 202 may be connected to multiple client information handling systems 204A-C. The host information handling system 202 may, for example, be a wireless dock, a laptop computer, a desktop computer, a tablet, a smartphone, or another information handling system. Likewise, the client information handling systems 204A-C may be laptop computers, desktop computers, tablets, smartphones, or other information handling systems. The host information handling system 202 may also wirelessly connect one or more of the client information handling systems 204A-C to one or more external devices, such as displays 206A-B. Thus, client information handling systems 204A-C may wirelessly transmit data to the host information handling system 202 for display on one or more of the displays 206A-B. The host information handling system 202 may connect the client information handling systems 204A-C to each other as well. For example, client information handling system 204A may transmit data packets to host information handling system 202 for transmission to client information handling system 204C. In some embodiments, the host information handling system 202 may also connect the client information handling systems 204A-C to the internet 208. Thus, the host information handling system 202 may function as a wireless router or access point with respect to one or more client information handling systems 204A-B, receiving data from and transmitting data to the internet 208 from the client information handling systems. In some embodiments, the host information handling system 202 may connect the client information handling systems 204A-C to a router that is connected to the internet 208.

Host information handling systems may have limited uplink and downlink capacity for receiving data from and transmitting data to client information handling systems 204A-C. For example, a dock 202 may have limited uplink and downlink bandwidth for receiving data from and transmitting data to the client information handling systems 204A-C and external devices 206A-B. Prioritization of bandwidth usage within the closed-loop system of the host information handling system 202, the client information handling systems 204A-C, and the external devices, such as displays 206A-B, may enhance a user experience by reducing time required to transmit and receive data that is important to a user and by avoiding loss of data that is important to a user. A host information handling system 202, such as a dock, may aggregate data from multiple client information handling systems 204A-C, other external devices 206A-B, and/or the internet 208 for transmission to client information handling systems 204A-C and/or external devices 206A-B. The host information handling system 202 may tag data packets received for transmission based on priority. A priority may, for example, be assigned to the data packets based, at least in part, on characteristics of the data packets. For example, the host information handling system 202 may assign a higher priority to data packets related to a video conference application run by client information handling system 204A than data packets related to a file download by information handling system 204C. The host information handling system 202 may compare an aggregate size of a plurality of packets received for transmission with a size threshold. The size threshold may, for example, be related to a maximum uplink capacity of the host information handling system 202. For example, the threshold may be set based on a maximum number of packets that can be transmitted in a certain time period, such as based on a maximum uplink bandwidth of the host information handling system. If the aggregate size of the packets exceeds the threshold, the host information handling system 202 may determine a subset of the packets for transmission. For example, the host information handling system 202 may select packets for transmission that will provide a highest aggregate priority value while maintaining an aggregate size of the subset of packets at or below the threshold. Thus, as one example, the host information handling system 202 may determine to transmit packets from the video conferencing application executed by client information handling system 204A while delaying transmission of packets related to a file download by client information handling system 204C.

The host information handling system 202 may also allocate downlink bandwidth usage among the client information handling systems 204A-C. For example, the host information handling system 202 may determine that there are three client information handling systems 204A-C connected to the host information handling system 202 and may allocate downlink bandwidth among the client information handling systems 204A-C. The host information handling system 202 may, for example, divide a maximum downlink bandwidth of the host information handling system 202 by three, assigning one third of the maximum downlink bandwidth to each of the client information handling systems 204A-C. The host information handling system 202 may communicate the downlink bandwidth allocations to each client information handling system via an out of band communication channel between the host information handling system 202 and each client information handling system 204A-C, such as an out of band control channel of host information handling system 202. Thus, each of the client information handling systems 204A-C may transmit data to the host information handling system 202 using the bandwidth allocated to each respective client information handling system 204A-C.

In some embodiments, the host information handling system 202 may allocate different amounts of downlink bandwidth to the client information handling systems 204A-C. For example, a system administrator or user may assign priority levels to each client information handling system 204A-C, and bandwidth may be allocated to the client information handling systems 204A-C based on the assigned priority. Alternatively or additionally, a priority of each client information handling system 204A-C may be determined based on applications run by each client information handling system or an amount of downlink bandwidth used by each client information handling system during a previous time period. Thus, downlink bandwidth allocation may be customized to fit a variety of usage scenarios.

Figure 3:
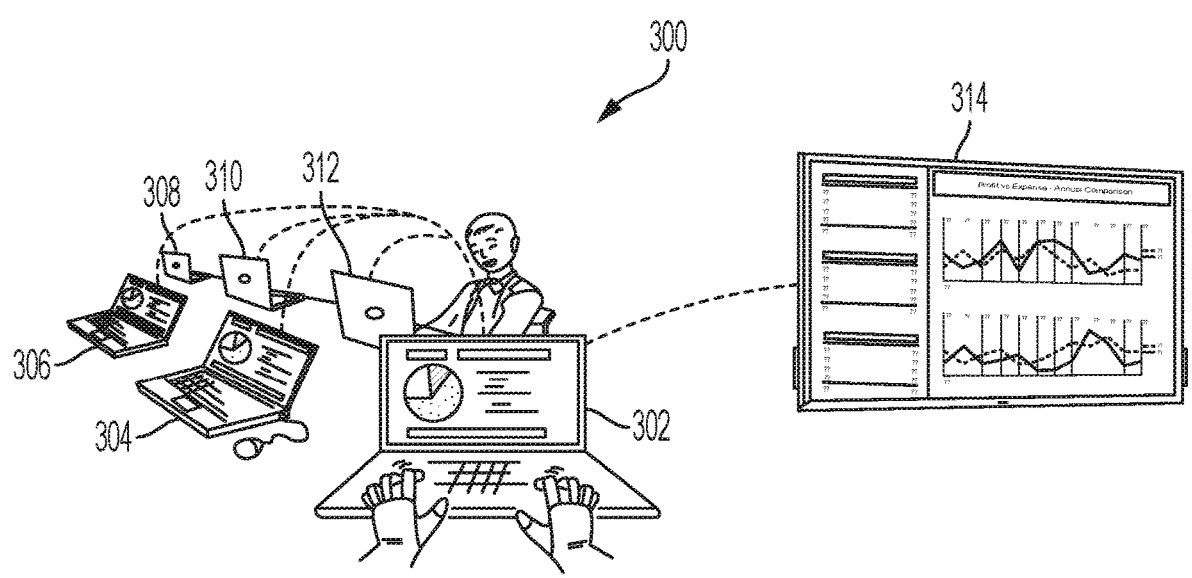
FIG. 3 is an illustration of an example network of connected information handling systems according to some embodiments of the disclosure.

In some embodiments, a host information handling system 302 may be a laptop computer, as shown in the example network 300 of FIG. 3. A user may connect the host information handling system 302 to multiple client information handling systems 304, 306, 308, 310, 312, 314. For example, in a meeting scenario, a presenter may operate host information handling system 302 to present on a smart display 314 while transferring files to and/or screen sharing with client information handling systems 304, 306, 308, 310, 312, such as laptops, tablets, or smart phones, operated by other meeting attendees. The host information handling system 302 may also transmit the presentation and a video feed to one or more remote client information handling systems, for meeting attendees at another location, and may also receive one or more file uploads from meeting attendees at the remote location. Additionally, one or more of the client information handling systems 304-312 may transmit video data, such as video of the presentation received from host information handling system 302, to one or more remote information handling systems.

As one example, the host information handling system 302 may screen share with the smart display 314 and/or one or more of the other client information handling systems 304-312. For example, a software process on the host information handling system 302 may automatically discover client information handling systems 304-314. A user of the host information handling system 302 may select the client information handling systems 302-314 with which to screen share. In some embodiments, the host information handling system 302 may receive notifications when each of the client information handling systems 302-314 accept a screen sharing invitation. In some embodiments, icons representing local information handling systems that have been detected and/or have agreed to connect may be displayed on a display of the host information handling system 302. A user of the host information handling system 302 may initiate a file transfer to one or more client information handling systems 304-312 by dragging and dropping a file onto an icon representing a client information handling system. In some embodiments, the client information handling system may be prompted with an invitation to accept the file transfer before the file transfer is performed. Thus, multiple different kinds of data may be transferred between the host information handling system 302 and the plurality of client information handling systems 304-314 at the same time.

The host information handling system 302 may, as described herein, prioritize packets for transmission to client information handling systems 304-314 based on characteristics of the packets and may select a subset of packets for transmission to client information handling systems 304-314 if an aggregated size of packets to be transmitted exceeds a predetermined size threshold. The host information handling system 302 may also communicate with client information handling systems 304-314 to allocate downlink bandwidth to each of client information handling systems 304-314 for transmission of data from the client information handling systems 304-314 to the host information handling system 302.

As another example, a host information handling system 302 may connect to a client information handling system 304 for streaming of a gaming application in a peer to peer gaming streaming application. For example, the host information handling system may stream a game displayed on a display of the host information handling system 302 along with video of a user of the host information handling system 302 and/or audio of the user of the host information handling system 302 to a client information handling system, while receiving audio and/or video data of a user of the client information handling system 304. In some embodiments the host and client information handling systems may be remotely connected, such as through the internet. The host information handling system 302 may, at the same time, be streaming audio from a source such as the internet or a private server. The host information handling system may prioritize transmission of data to one or more client information handling systems, such as client information handling system 304, and may also allocate downlink bandwidth to one or more client information handling systems, such as client information handling system 304. For example, the host information handling system 302 may manage bandwidth usage to maintain a high quality video and/or audio stream between the two connected information handling systems while deprioritizing data packets not related gaming streaming.

Figure 4:
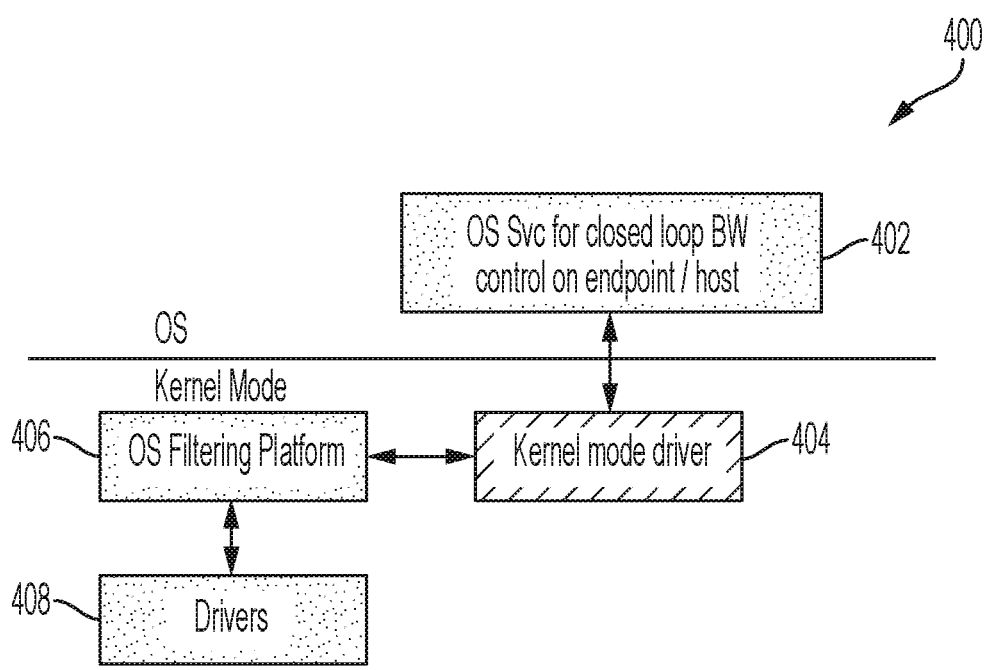
FIG. 4 is a block diagram of a plurality of software modules for managing bandwidth of a host information handling system according to some embodiments of the disclosure.

An operating system service of a host information handling system may manage packet prioritization and downlink bandwidth allocation to client information handling systems. For example, an operating system service 402, as shown in the software block diagram 400 of FIG. 4, may prioritize packets for transmission and allocate downlink bandwidth to connected client information handling systems as described herein. The operating system service 402 may communicate with a kernel mode driver 404 of the host information handling system to control bandwidth allocation. The kernel mode driver 404 may communicate with an OS filtering platform 406, such as a Windows filtering platform. The OS filtering platform 406 may communicate with one or more Windows Driver Model (WDM) drivers 408 for packet prioritization and bandwidth allocation. The kernel mode driver 404, the OS filtering platform 406, and one or more WDM drivers 408 may be located in an input/output control shared memory. Thus, the OS service for packet prioritization and bandwidth allocation may integrate with existing OS software and drivers to manage packet prioritization and downlink bandwidth allocation.

Figure 5:
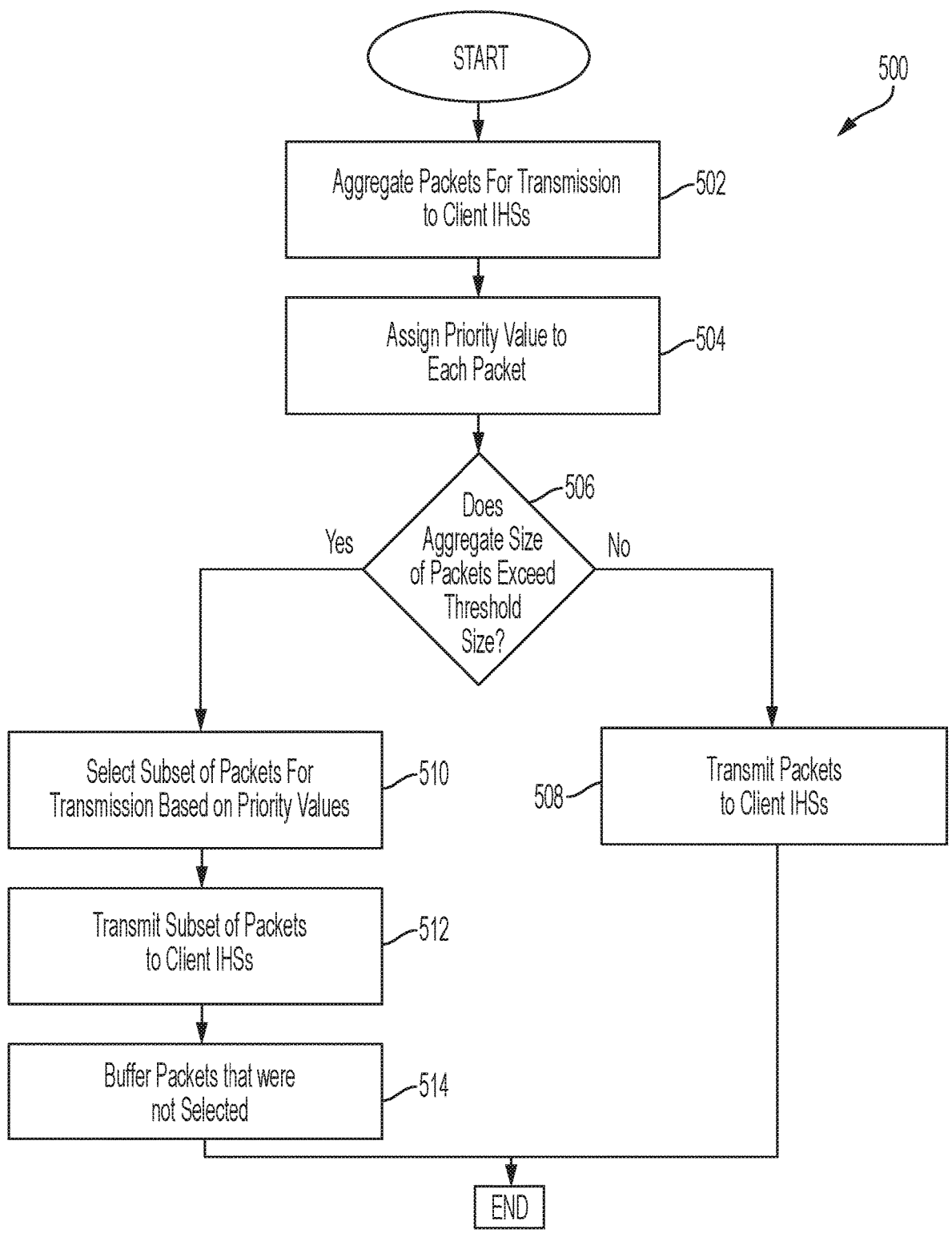
FIG. 5 is a process flow diagram of an example method for managing packet transmission by a host information handling system according to some embodiments of the disclosure.

A host information handling system, such as a wireless dock, laptop, desktop, or other information handling system, may prioritize packet transmission to a plurality of client information handling systems to maintain packet transmission within a bandwidth capacity of the host information handling system. An example method 500 for closed loop packet transmission management by a host information handling system is shown in FIG. 5. The method 500 may be performed by a host information handling system, such as a wireless dock or a laptop computer. The host information handling system may be connected to multiple client information handling system via wireless and/or wired connections. The host information handling system may be connected to the multiple client information handling systems via a local wireless or wired network rather than over the internet. The method 500 may begin, at step 502, with aggregation of packets for transmission to one or more client information handling systems. For example, a host information handling system may receive packets for transmission to a first client information handling system and packets for transmission to a second client information handling system. Such packets may, for example, be received from client information handling systems, generated by the host information handling system, received from external information handling systems, such as via the internet, or received from other sources. For example, packets from a presentation video stream may be received by the host information handling system from a first client information handling system and designated for transmission to a second client information handling system. Meanwhile, packets associated with a file transfer operation may be received from a third client information handling system designated for transmission to the first client information handling system. Thus, packets from a variety of sources may be aggregated by the host information handling system for transmission to a plurality of client information handling systems.

The host information handling system may, at step 504, assign priority values to each of the aggregated packets. Priority values may be assigned to each of the aggregated packets based on one or more characteristics of the packets, such as a source of the packets, a type of data in the packets, an application with which the packets are associated, a size of the packets, or other characteristics of the packets. For example, a host information handling system may be configured to assign high priority values to packets received from a first client information handling system and to assign low priority values to packets received from a second client information handling system. As another example, the host information handling system may be configured to tag packets containing video data with a higher priority value than packets containing document or file transmission data. As another example, the host information handling system may be configured to tag packets associated with a videoconferencing application with higher priority values than packets associated with a file transfer application. As another example, data packets associated with a game streaming application, such as an application for peer to peer video and audio streaming, may be given higher priority values than packets associated with a file transferred application. In some embodiments, each packet may be assigned a tuple of priority value and weight, where each packet is assigned a priority value, as described herein, and a weight value based on a size or length of the packet. In some embodiments, the host information handling system may categorize the plurality of packets into a plurality of buckets based on one or more characteristics of each of the packets, and each bucket may be associated with a particular priority value.

At step 506, the host information handling system may determine whether the aggregate size of the plurality of packets aggregated by the host information handling system exceeds a threshold size. For example, the host information handling system may determine the weights of each of the packets and may determine, based on the packet weights, whether a size of data to be transmitted in the aggregated packets exceeds a threshold size. The threshold size may be set based on an uplink capacity of the host information handling system. For example, the threshold size value may be set at a maximum uplink capacity of the host information handling system. The uplink capacity of the host information handling system may, for example, be a maximum uplink bandwidth of the host information handling system for a time period during which the plurality of packets is to be transmitted. If the aggregate size of the packets to be transmitted to the client information handling systems does not exceed the threshold size, the host information handling system may, at step 508, transmit the packets to the client information handling systems.

If the aggregate size of the plurality of packets to be transmitted to the client information handling systems does exceeds the threshold size, the host information handling system may, at step 510, select a subset of the aggregated packets for transmission to the client information handling systems. For example, the host information handling system may select the subset of packets for transmission based, at least in part, on the priority values of the packets. For example, the host information handling system may select a subset of the plurality of packets that has a highest aggregate priority value while maintaining a size of the subset of the plurality of packets at or below the threshold size. The host information handling system may maximize the average priority value of the subset of packets to be transmitted to the client information handling systems, while maintaining a size of the subset of the plurality of packets at or below the threshold size.

At step 512, the host information handling system may transmit the subset of packets to the client information handling systems. For example, the host information handling system may transmit packets of the subset of packets that are designated for a first client information handling system to the first client information handling system and may transmit packets of the subset of packets that are designated for a second client information handling system to the second client information handling system In some embodiments, the host information handling system may, at step 514, store the packets of the plurality of packets that were not selected as part of the subset of packets for transmission in a buffer of the host information handling system for transmission to the client information handling systems at a later time. Thus, the host information handling system may prioritize packets for transmission to client information handling system if an aggregate size of the packets exceeds a size threshold.

Figure 6:
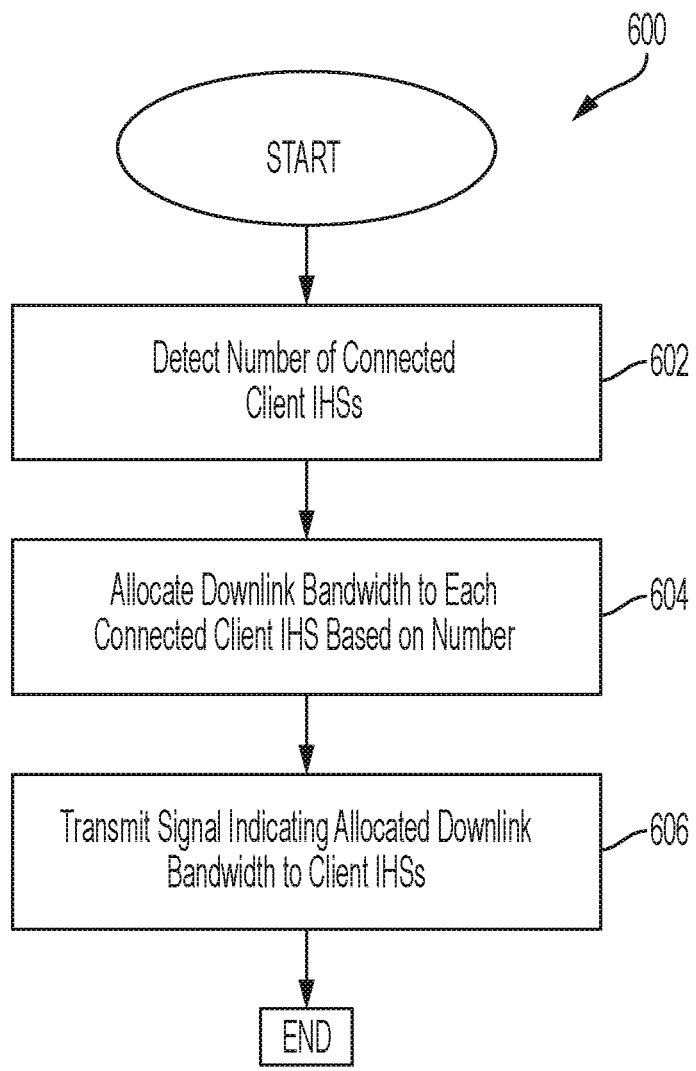
FIG. 6 is a process flow diagram of an example method for allocation of downlink bandwidth by a host information handling system according to some embodiments of the disclosure.

A host information handling system may also manage downlink bandwidth allocations of client information handling systems to enhance bandwidth usage efficiency. An example method 600 for managing client information handling system bandwidth is shown in FIG. 6. The method 600 may begin at step 602 with determining a number of connected client information handling systems. For example, a host information handling system may determine how many client information handling systems are connected to the host information handling system. In some embodiments the host information handling system may communicate with each connected client information handling system to determine a number of client information handling systems connected to the host information handling system.

At step 604, the host information handling system may allocate downlink bandwidth to each connected client information handling system based on the number of connected client information handling systems. For example, a host information handling system may have a maximum downlink bandwidth rate at which it can receive downlink data. Based on the number of connected client information handling systems, the host information handling system may allocate a portion of the maximum downlink bandwidth to each of the client information handling systems. In some embodiments the host information handling system may allocate an equal portion of the downlink bandwidth to each of the client information handling systems such that all the downlink bandwidth will be allocated to the client information handling systems. In some embodiments the host information handling system may allocate bandwidth to each client information handling system based on a priority of each client information handling system. For example, a client information handling system run by a meeting organizer may be given a higher priority than a client information handling system run by a meeting attendee, to prioritize transmission of data, such as video or presentation data, from the client information handling system run by the meeting organizer over data from client information handling systems run by meeting attendees. Thus, the client information handling systems with higher priority may be allocated more downlink bandwidth than client information handling systems with lower priority. In some embodiments, downlink bandwidth may be allocated to client information handling systems based on other factors, such as historic bandwidth usage, applications executed by the client information handling systems, and other factors.

At step 606, the host information handling system may transmit one or more signals indicating allocated downlink bandwidth to the client information handling systems. For example, the host information handling system may be connected to each client information handling system via an out of band channel, such as an out of band control channel. The host information handling system may transmit a signal to each client information handling system indicating a downlink bandwidth that has been assigned to that respective client information handling system via an out of band channel. Transmission on the out of band communication channel may avoid consumption of bandwidth for data traffic in transmission of the downlink bandwidth allocation to each client information handling system. The client information handling systems may then each implement the allocated downlink bandwidths. For example, each client information handling system may limit or throttle data transmitted to the host information handling system according to the downlink bandwidth allocated to each client information handling system. The host information handling system may then receive downlink packets from one or more of the client information handling systems at a cumulative rate that remains at or below the maximum downlink bandwidth of the host information handling system. Thus, data received by the host information handling system from client information handling systems may be limited based on a maximum bandwidth capacity of the host information handling system.

Figure 7:
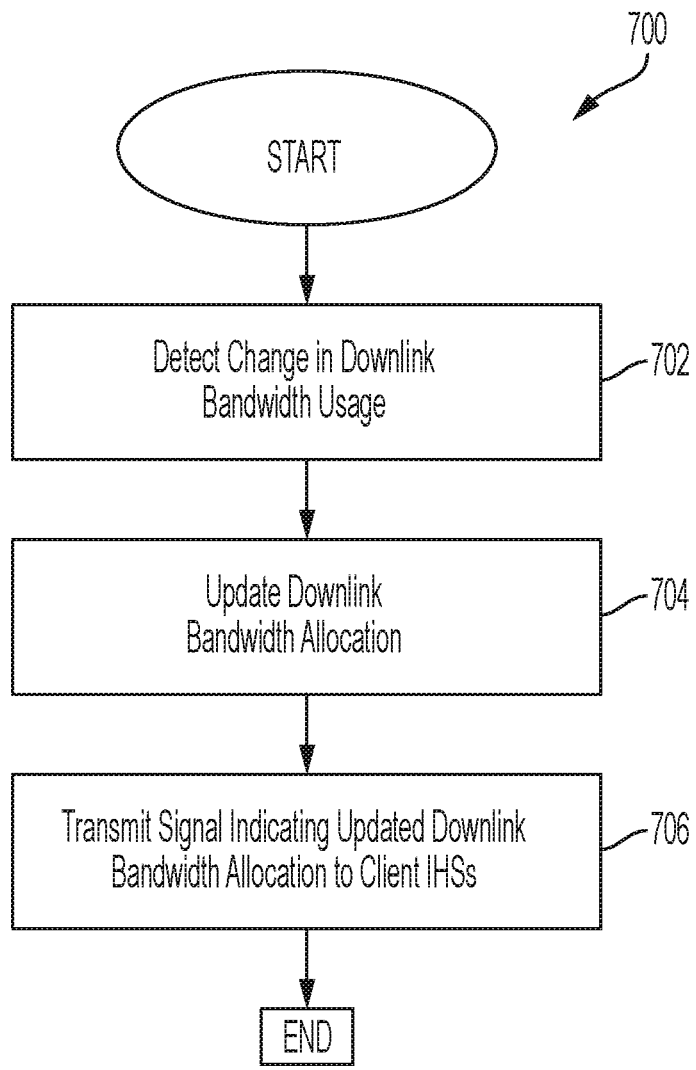
FIG. 7 is a process flow diagram of an example method for adjustment of downlink bandwidth allocation by a host information handling system according to some embodiments of the disclosure.

A host information handling system may also update bandwidth allocations based on bandwidth usage by client information handling systems. An example method 700 for adjusting bandwidth allocations is shown in FIG. 7. The method 700 may begin, at step 702, with detecting a change in downlink bandwidth usage. For example, the host information handling system may monitor data packets received from the client information handling systems to determine a usage of each bandwidth allocation by each client information handling system. The host information handling system may detect that a first client information handling system is using most or all of its allocated bandwidth and/or that a second client information handling system is not using all or most of its allocated bandwidth. For example, a client information handling system may detect that downlink bandwidth usage by a first client information handling system has dropped below a predetermined threshold, such as below a predetermined amount under a bandwidth allocation assigned to the first client information handling system. In some embodiments, the host information handling system may wait a predetermined period of time before adjusting a bandwidth allocation to determine whether a drop in bandwidth usage is merely a temporary or a more long term drop.

At step 704, the host information handling system may update the downlink bandwidth allocations of the client information handling systems. For example, the host information handling system may determine that downlink bandwidth usage by a first client information handling system has dropped below a threshold while downlink bandwidth usage by a second client information handling system has consistently been close to or at the downlink bandwidth allocation of the second client information handling system. The host information handling system may reduce the downlink bandwidth allocation of the first client information handling system while increasing the downlink bandwidth allocation of the second client information handling system. In some embodiments the host information handling system may allocate a portion of the downlink bandwidth made available by the reduction in the downlink bandwidth allocation of the first client information handling system among the remaining client information handling systems. In some embodiments, the host information handling system may detect that a client information handling system has disconnected and may reallocate the downlink bandwidth allocated to the disconnected client information handling system among the remaining connected client information handling systems. In some embodiments, the host information handling system may detect that a new client information handling system is connected, and may reduce bandwidth allocations of one or more previously connected client information handling systems and allocate bandwidth equivalent to the reduction in downlink bandwidth to the new client information handling systems.

At step 706, the host information handling system may transmit one or more signals indicating the updated downlink bandwidth allocation to client information handling systems. As discussed above, such bandwidth allocation indications may be transmitted on an out of band communication channel, such as an out of band control channel. In some embodiments the updated bandwidth allocations will be transmitted only to the client information handling systems having bandwidths that have been updated, while in other embodiments, bandwidth allocations may be transmitted to each of the client information handling systems. In some embodiments, a host information handling system may perform the method 700 to adjust downlink bandwidth allocations once or twice per second or at an even wider time interval. Thus, a host information handling system may update downlink bandwidth allocations based on changes in bandwidth usage. In some embodiments, the method 700 may be performed following the method 600 of FIG. 6 and/or before, contemporaneously with, or following the method 500 of FIG. 5.

The process flow diagrams of FIGS. 5-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for managing traffic associated with a host information handling system, comprising:
    aggregating, by the host information handling system, a plurality of packets for transmission from the host information handling system to a plurality of client information handling systems;
    assigning, by the host information handling system, a priority value to each of the plurality of packets;
    determining, by the host information handling system, that an aggregate size of the plurality of packets exceeds a threshold size;
    selecting, by the host information handling system, a subset of the plurality of packets for transmission to the plurality of client information handling systems based, at least in part, on the assigned priority values of each of the plurality of packets, wherein selecting the subset of the plurality of packets for transmission comprises determining the subset of the plurality of packets with a highest aggregate priority value while maintaining an aggregate size of the subset of the plurality of packets less than or equal to an uplink capacity of the host information handling system;
    transmitting, by the host information handling system, the selected subset of the plurality of packets to the plurality of client information handling systems; and
    pushing, by the host information handling system, the packets of the plurality of packets that are not in the selected subset to a buffer of the host information handling system for transmission after transmission of the selected subset.

2. The method of claim 1, wherein determining that an aggregate size of the plurality of packets exceeds a threshold size comprises:
    assigning a size value to each of the plurality of packets based, at least in part, on a length of each of the plurality of packets;
    determining a sum of the size values of each of the plurality of packets; and
    determining that the sum is greater than the threshold size, wherein the threshold size is set based, at least in part, on an uplink capacity of the host information handling system.

3. The method of claim 1, wherein the host information handling system comprises a wireless dock.

4. The method of claim 1, wherein the priority value is assigned to each of the packets based, at least in part, on a type of data in each of the packets.

5. The method of claim 1, further comprising:
    determining, by the host information handling system, a number of the plurality of client information handling systems connected to the host information handling system; and
    allocating, by the host information handling system, a downlink bandwidth to each of the plurality of client information handling systems based, at least in part, on the number of client information handling systems connected to the host information handling system and a downlink bandwidth of the host information handling system.

6. The method of claim 5, further comprising:
    transmitting, by the host information handling system, a signal indicating the allocated downlink bandwidth to each of the plurality of client information handling systems on an out of band communication channel.

7. The method of claim 5, further comprising:
    assigning, by the host information handling system, priority levels to each of the plurality of client information handling systems based, at least in part, on an amount of downlink bandwidth used by each of the plurality of client information handling systems during a time period,
    wherein allocating the downlink bandwidth to each of the plurality of client information handling systems is further based, at least in part, on the assigned priority levels.

8. An information handling system comprising:
    a processor; and
    a memory,
    wherein the processor is further configured to perform steps comprising:
        aggregating a plurality of packets for transmission from the information handling system to a plurality of client information handling systems;
        assigning a priority value to each of the plurality of packets;
        determining that an aggregate size of the plurality of packets exceeds a threshold size;
        selecting a subset of the plurality of packets for transmission to the plurality of client information handling systems based, at least in part, on the assigned priority values of each of the plurality of packets, wherein selecting the subset of the plurality of packets for transmission comprises determining the subset of the plurality of packets with a highest aggregate priority value while maintaining a size of the subset of the plurality of packets less than or equal to an uplink capacity of the information handling system;
        transmitting the selected subset of the plurality of packets to the plurality of client information handling systems; and
        pushing the packets of the plurality of packets that are not in the selected subset to a buffer of the information handling system for transmission after transmission of the selected subset.

9. The information handling system of claim 8, wherein determining that an aggregate size of the plurality of packets exceeds a threshold size comprises:
    assigning a size value to each of the plurality of packets based, at least in part, on a length of each of the plurality of packets;
    determining a sum of the size values of each of the plurality of packets; and
    determining that the sum is greater than a threshold size, wherein the threshold size is set based, at least in part, on an uplink capacity of the information handling system.

10. The information handling system of claim 8, wherein the information handling system comprises a wireless dock.

11. The information handling system of claim 9, wherein the priority value is assigned to each of the packets based, at least in part, on a type of data in each of the packets.

12. The information handling system of claim 8, wherein the processor is further configured to perform steps comprising:
- determining a number of the plurality of client information handling systems connected to the information handling system; and
- allocating a downlink bandwidth to each of the plurality of client information handling systems based, at least in part, on the number of client information handling systems connected to the information handling system and a downlink bandwidth of the information handling system.

13. The information handling system of claim 12, wherein the processor is further configured to perform steps comprising:
- transmitting a signal indicating the allocated downlink bandwidth to each of the plurality of client information handling systems on one or more out of band communication channels.

14. The information handling system of claim 12, wherein the processor is further configured to perform steps comprising:
- assigning priority levels to each of the plurality of client information handling systems based, at least in part, on an amount of downlink bandwidth used by each of the plurality of client information handling systems during a time period,
- wherein allocating the downlink bandwidth to each of the plurality of client information handling systems is further based, at least in part, on the assigned priority levels.

* * * * *